(12) United States Patent
Buchleitner et al.

(10) Patent No.: US 9,482,334 B2
(45) Date of Patent: Nov. 1, 2016

(54) GEARWHEEL ARRANGEMENT

(71) Applicant: Miba Sinter Austria GmbH, Laakirchen (AT)

(72) Inventors: Helmut Buchleitner, Seewalchen (AT); Karl Dickinger, Vorchdorf (AT); Christian Dumanski, Plesching-Steyregg (AT)

(73) Assignee: Miba Sinter Austria GmbH, Laakirchen (AT)

( * ) Notice: Subject to any disclaimer, the term of this patent is extended or adjusted under 35 U.S.C. 154(b) by 331 days.

(21) Appl. No.: 14/174,921

(22) Filed: Feb. 7, 2014

(65) Prior Publication Data

US 2014/0224053 A1    Aug. 14, 2014

(30) Foreign Application Priority Data

Feb. 8, 2013   (AT) .............................. A 50098/2013

(51) Int. Cl.
*F16H 55/17*    (2006.01)
*F16H 55/18*    (2006.01)
*F16H 57/00*    (2012.01)
*F16H 55/12*    (2006.01)

(52) U.S. Cl.
CPC .............. *F16H 55/17* (2013.01); *F16H 55/18* (2013.01); *F16H 55/12* (2013.01); *F16H 57/0031* (2013.01); *Y10T 74/19916* (2015.01)

(58) Field of Classification Search
USPC ......................................................... 74/445
See application file for complete search history.

(56) References Cited

U.S. PATENT DOCUMENTS

| 2004/0060379 A1* | 4/2004 | Bernhard | B62D 5/0409 74/388 PS |
| 2008/0141811 A1 | 6/2008 | Sandner | |
| 2011/0174105 A1* | 7/2011 | Meier | F16D 1/116 74/448 |

FOREIGN PATENT DOCUMENTS

| AT | WO 2005090830 A1 * | 9/2005 | ............. F16H 55/18 |
| AT | 506961 A4 * | 1/2010 | ............. F16H 55/18 |
| AT | 507071 A4 * | 2/2010 | ............. F16H 55/18 |
| AT | 510283 A4 * | 3/2012 | ............. F16H 55/18 |
| CA | 2560632 A1 * | 9/2005 | ............. F16H 55/18 |
| FR | 2806775 A1 * | 9/2001 | ............. F16H 55/18 |
| WO | 2005/090830 A1 | 9/2005 | |

* cited by examiner

*Primary Examiner* — William Kelleher
*Assistant Examiner* — Randell J Krug
(74) *Attorney, Agent, or Firm* — Collard & Roe, P.C.

(57) ABSTRACT

The invention relates to a gearwheel arrangement (1) with a main gearwheel (2) and a gearwheel (4) rotatable relative to the latter in circumferential direction (3), wherein the main gearwheel (2) comprises a hub (5) on which the rotatable gearwheel (4) is arranged, and with a spring element (7), which is arranged between the main gearwheel (2) and the rotatable gearwheel (4), and by means of which the rotatable gearwheel (4) is pretensioned in circumferential direction (3) against the main gearwheel (2), wherein the main gearwheel (2) comprises at least one first support element (22) and the rotatable gearwheel (4) comprises at least one second support element (23), and wherein the spring element (7) is arranged between the first and the second support element (22, 23) and thereby spaced apart from the first surface (19) of the main gearwheel (2) and from the second surface (21) of the rotatable gearwheel (4).

10 Claims, 3 Drawing Sheets

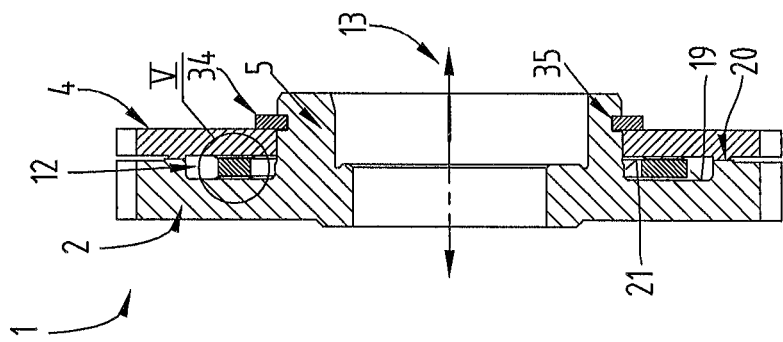
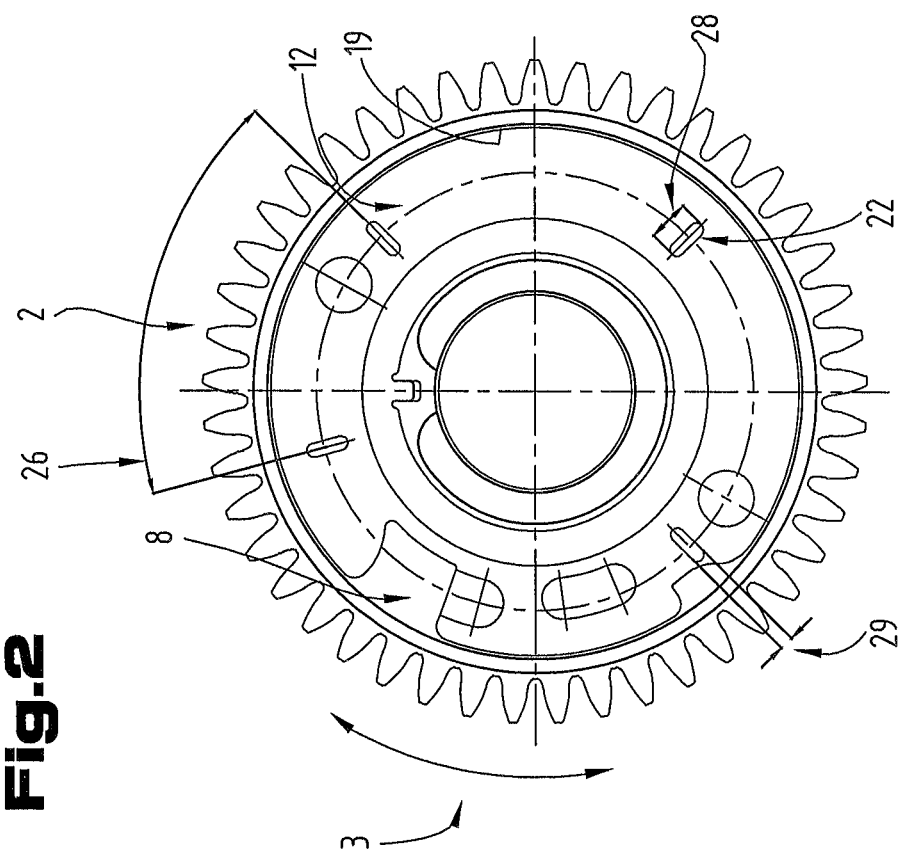

GEARWHEEL ARRANGEMENT

CROSS REFERENCE TO RELATED APPLICATIONS

Applicant claims priority under 35 U.S.C. §119 of Austrian Application No. A 50098/2013 filed on Feb. 8, 2013, the disclosure of which is incorporated by reference.

The invention relates to a gearwheel arrangement with a main gearwheel and a gearwheel rotatable relative to the latter in circumferential direction, wherein the main gearwheel comprises a hub, on which the rotatable gearwheel is arranged, and wherein the main gearwheel comprises a first surface and the rotatable gearwheel comprises a second surface, and with a spring element, which is arranged between the first surface of the main gearwheel and the second surface of the rotatable gearwheel, and by means of which the rotatable gearwheel is pretensioned in circumferential direction against the main gearwheel.

A gearwheel arrangement of this kind is known for example from WO 2005/090830 A1, which has a gearwheel for a play-free spur gear stage with a hub, with a gear rim supported by the hub, which is divided along an axially normal dividing plane into two part rims, namely into a hub-secure gear rim and a gear ring mounted coaxially rotatably relative to the latter, and with an annular spring surrounding the hub, which is supported by its ends opposite one another in circumferential direction on support webs formed in one piece by the two part rims, which are arranged behind one another in the circumferential direction of the gear rim.

In such gearwheel arrangements it may occur during operation that the annular spring slides over the support webs and in this way gets jammed between the part gearwheels. This results in the failure of the gearwheel arrangement and possibly damage to the latter.

The objective of the present invention is to improve the aforementioned gearwheel arrangement with regard to its functional safety during operation.

This objective is achieved in the aforementioned gearwheel arrangement in that the main gearwheel comprises on the first surface a plurality of first support elements projecting over said first surface in the direction of the second surface of the rotatable gearwheel and the rotatable gearwheel comprises a plurality of second support elements projecting over said second surface in the direction of the first surface of the main gearwheel, wherein the spring element is arranged between the first and the second support elements and thereby spaced apart from the first surface of the main gearwheel and the second surface of the rotatable gearwheel.

In this way it is achieved that the spring element can be held better in axial direction of the gearwheel arrangement in a planar position, whereby the twisting of the spring element is avoided more effectively under load. As a result it is possible to prevent more effectively the spring element sliding over the support webs, on which the spring element is normally supported, and the jamming of the spring element between the main gearwheel and the rotatable gearwheel, thereby improving the functional safety.

According to one embodiment variant it is possible to arrange at least three second support elements. Although it is an advantage with regard to the alignment of the spring element between the main gearwheel and the rotatable gearwheel if the support surface for the spring element is configured to be larger, this embodiment variant has the advantage that in this way friction is reduced between the support elements and the spring element, whereby as a result wear to the support elements can be reduced.

However, according to a further embodiment variant at least four first support elements can be arranged. Said embodiment variant has the advantage that the fitting of the support elements on the first surface can be adjusted more effectively to the specific loads of the spring element, i.e. in particular also an asymmetric arrangement of the support elements is possible on the first surface of the main gearwheel.

To further reduce the wear caused by friction between the support elements and the spring element, it is an advantage if the support element or the first support element(s) and/or the support element and/or the second support element(s) are configured to be elongated with a longitudinal extension in radial direction of the gearwheel arrangement. By means of the elongated configuration in radial direction a better support of the spring element on the support elements is also achieved.

It has proved to be advantageous if the ratio of length to width of the support element or first support elements and/or the support element and the second support elements is selected from a range of from 2:1 to 8:1.

The spring element can, as already known, be configured as an $\Omega$-spring. In this case it is an advantage if a first support element is arranged in the area next to the open area of the $\Omega$-spring, whereby it is possible to achieve a further improvement with respect to preventing the jamming of the spring element by sliding over the support webs of the main gearwheel and the rotatable gearwheel.

The first surface of the main gearwheel and the second surface of the rotatable gearwheel are arranged spaced apart by a distance x from one another in the gearwheel arrangement. It is an advantage in this case if a first height of the at least one first support element above the first surface, a second height of the at least one second support element above the second surface and a wall thickness of the spring element in axial direction of the gearwheel arrangement in total between 50% and 100% corresponds to the distance x. By means of this embodiment variant also a further improvement is achieved with respect to preventing the jamming of the spring element by sliding over the support webs of the main gearwheel and the rotatable gearwheel.

To reduce the wear by friction it is possible that the support elements and/or the spring element is or are provided at least in some areas with a lubricant coating. However, in this way it is also achieved in particular that the movability of the spring element in circumferential direction of the gearwheel arrangement is improved, whereby the rotation of the spring elements under load can be prevented more effectively. As the spring element can be held more effectively in a planar position the risk of the spring element jamming can be reduced.

Furthermore, it is possible to deliberately increase the friction in that the rotatable gearwheel is pretensioned by an additional spring element in axial direction against the main gearwheel. In this way improved acoustic behavior of the gearwheel arrangement is achieved.

For a better understanding of the invention the latter is explained in more detail with reference to the following Figures.

In a schematically simplified representation:

FIG. 2 shows a main gearwheel of a gearwheel arrangement in side view;

FIG. 4 shows a cross section of a gearwheel arrangement;

Figure 1:
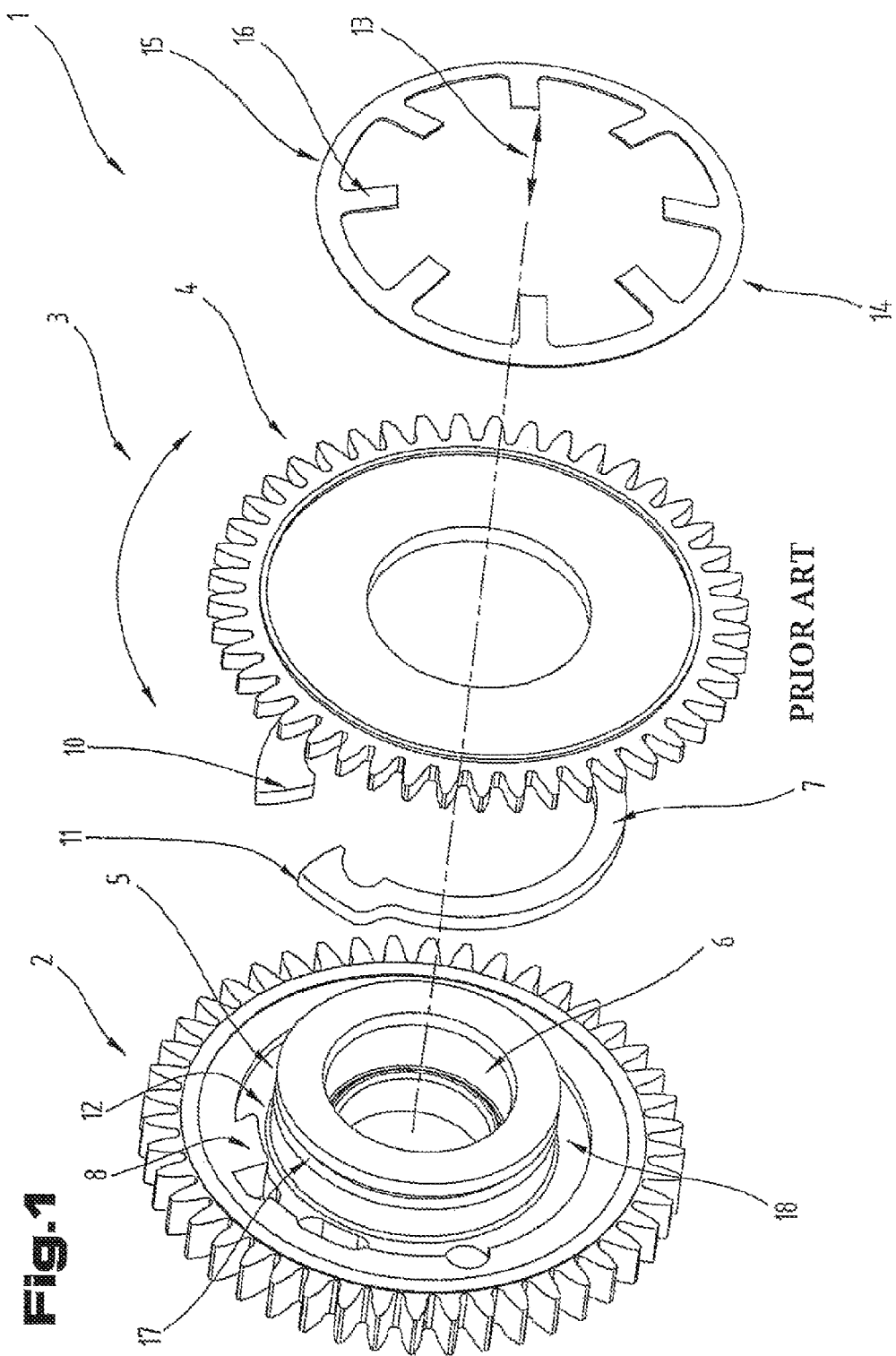
FIG. 1 shows a gearwheel arrangement according to the prior art in an exploded view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows in an exploded view a gearwheel arrangement 1, as known from the prior art. Said gearwheel arrangement 1, also referred to as a "split-gear", comprises a main gearwheel 2 and a gearwheel 4 rotatable relative to the latter in circumferential direction 3, wherein the main gearwheel 2 comprises a hub 5, which is configured in particular in one piece with the main gearwheel 2. The rotatable gearwheel 4 is arranged rotatably on the hub 5 of the main gearwheel 2. The hub 5 comprises a recess 6 in the form of a bore for mounting a shaft that is not shown.

The rotatable gearwheel 4 is pretensioned by means of a spring element 7, which in this case is configured as a so-called Ω-spring, i.e. an omega spring, in circumferential direction 3 relative to the main gearwheel 2, as described in WO 2005/090830 A1, which thus belongs in this extent of the main structure of the gearwheel arrangement 1 to the contents of the present description. For the pretensioning, as already described, a support web 8 is formed on the main gearwheel 2 which support web forms a mounting stop for an additional support web 9 (cf. FIG. 3) which is formed on the rotatable gearwheel 2. The spring element 7 bears on said support webs 8, 9 with its two open end sections 10, 11. The spring element 7 is arranged in a recess 12 in the main gearwheel 2, i.e. between the main gearwheel 2 and the rotatable gearwheel 4.

In order to secure the rotatable gearwheel 4 also in axial direction 13 a securing ring can be arranged, as described further in the following.

Furthermore, it is possible to pretension the rotatable gearwheel against the main gearwheel 2. In addition a further spring element 14 can be provided which in this embodiment variant has the form of a disc spring, in particular a slit disc spring defined in the broadest sense. Said additional spring element 14 comprises an outer ring 15, from which a plurality of tongues 16, so-called flexible tongues, project pointing obliquely radially inwardly. Said tongues 16 are mounted by a circumferential groove 17, which is formed in an end section 18 of the hub 5. By means of the spring tension in this way the additional rotatable gearwheel 4 is pretensioned in axial direction relative to the main gearwheel.

Figure 3:
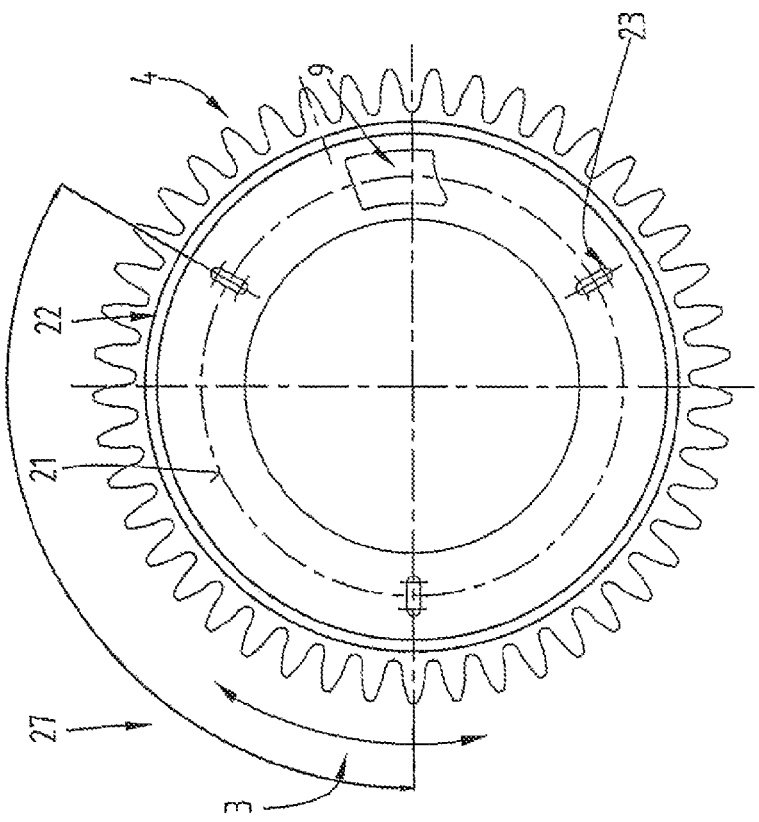
FIG. 3 shows a rotatable gearwheel of a gearwheel arrangement in side view.

FIGS. 2 to 5 show an embodiment variant of the gearwheel arrangement 1 according to the invention. FIGS. 2 and 3 show side views of the main gearwheel 2 or the rotatable gearwheel 4 in axial direction 13 (cf. FIG. 4).

Figure 5:
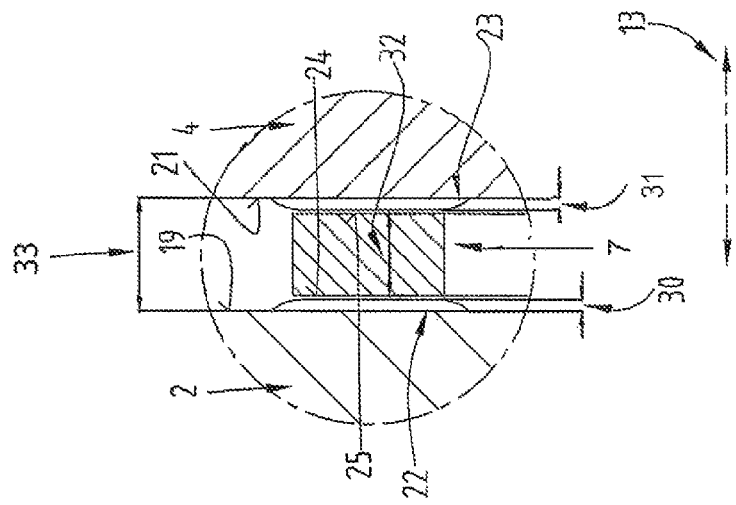
FIG. 5 shows a detailed view of the gearwheel arrangement according to FIG. 4 according to the circle denoted V in FIG. 4.

The main gearwheel 2 comprises a first surface 19. Said first surface 19, also denoted as an end face or axial end face, in the assembled state of the gearwheel arrangement 1 lies opposite the rotatable gearwheel 4, as shown in FIGS. 4 and 5. In particular, the first surface 19 forms the base surface of the recess 12 in which the spring element 7 is arranged. In radial direction in the embodiment of the gearwheel arrangement 1 according to FIGS. 2 to 5 the recess is delimited by the hub 5 and an annular web 20, wherein the annular web 20 is spaced apart in radial direction from the hub 5. The rotatable gearwheel 4 bears on the annular web 20 on the main gearwheel 2.

The rotatable gearwheel 2 comprises a second surface 21. Said second surface 21, also referred as an end face or axial end face, is in the assembled state of the gearwheel arrangement 1 opposite the main gearwheel 2, as also shown in FIGS. 4 and 5.

Optionally the rotatable gearwheel 4 can also comprise an annular web 22, by means of which it can fit onto the annular web 19 of the main gearwheel 2.

The spring element 7 is thus arranged in the assembled state of the gearwheel arrangement 1 between the first surface 19 of the main gearwheel 2 and the second surface 21 of the rotatable gearwheel 4.

On the first surface 19 of the main gearwheel 2 and projecting over the latter in axial direction 13 (FIG. 4) and in the direction of the second surface 21 of the rotatable gearwheel 2 a plurality of first support elements 22 are arranged and in particular are formed in one piece with the main gearwheel 2.

On the second surface 19 of the rotatable gearwheel 4 and projecting over the latter in axial direction 13 (FIG. 4) and in the direction of the first surface 19 of the main gearwheel 2 a plurality of second support elements 23 are arranged, and are formed in particular in one piece with the rotatable gearwheel 4.

As shown better from the detail in FIG. 5, the spring element 7 bears on said first and second support elements 22, 23. In particular, the arrangement of the first and second support elements 22 and 23 on the first surface 19 and the second surface 21 is such that the spring element 7 bears in axial direction 13 (FIG. 4) solely on the first and second support elements 22, 23 so that there is no contact with the first surface 19 of the main gearwheel and the second surface 21 of the rotatable gearwheel 4.

However, within the scope of the invention it is also possible that the spring element 7 is arranged spaced apart from the first support elements 22 and/or the second support elements 23. The distance between the first support elements 22 and the spring element 7 can be between 0.1 mm and 2 mm, in particular between 0.2 mm and 1 mm. The distance between the second support elements 22 and the spring element 7 can be between 0.1 mm and 2 mm, in particular between 0.2 mm and 1 mm.

Although the plural is always used in the following description with respect to the first and second support elements 22, 23, it is also possible within the scope of the invention for only one first and/or second support element 22, 23 to be arranged respectively. The arrangement of a plurality of first and/or second support elements 22, 23 is however the preferred embodiment variant.

The first support elements 22 comprise a first support surface 24 and the second support elements 23 a second support surface 25 for the spring element 7. In this case it is preferred if the first support surface 24 of the first support elements 22 and the second support surface 25 of the second support elements 23 have a dimension in radial direction, which is at least as large as the corresponding expansion of the spring element 7 in radial direction in the region of the mount.

In principle, on the main gearwheel up to twenty, in particular up to ten, i.e. for example two, three, four, five, six, seven, eight etc., first support elements 22 can be provided. If necessary, in special cases however more than twenty first support elements 22 can be arranged.

Likewise, on the rotatable gearwheel 4 up to twenty, in particular up to ten, i.e. for example two, three, four, five, six, seven, eight etc. second support elements 23 can be arranged. Likewise if necessary in special cases also more than twenty second support elements 23 can be arranged.

According to a preferred embodiment variant, as shown in FIG. 2, four first support elements 22 are arranged on the main gearwheel 2. Said four first support elements 22 can be arranged symmetrically in circumferential direction 3, in particular at right angles to one another. Preferably, a first angle 26, which is formed between two adjacent first support elements 22, is not equal to 90°. The first angle 26 can be selected from a range of from 20° to 80°, in particular from a range of from 30° to 70°.

An arrangement is particularly preferable in which a first support element 22 is arranged in the area of the support web 8 (FIG. 2) on the main gearwheel 2 and a second first support element 22 is arranged in the region of the support web 9 (FIG. 3) of the rotatable gearwheel 4, particularly if the spring element 7 is a so-called Ω-spring. Said two first support elements 22 can thus be arranged in circumferential direction 3 at a distance from the support webs 8, 9, which results from an angle between 1° and 45°, in particular from an angle between 5° and 30°, between the support webs 8, 9 and the first support elements 22 adjacent thereto. In particular, said two first support elements 22 are arranged next to the open part of the Ω-spring in the area below the Ω-spring, the Ω-Spring being better supported in this area.

According to a further preferred embodiment variant, as shown in FIG. 3, three second support elements 23 are arranged on the rotatable gearwheel 4. Said three second support elements 23 can be arranged symmetrically in circumferential direction 3, i.e. at an angle of 120° to one another. However, it is also possible that a second angle 27, that is formed between two adjacent second support elements 23, is not equal to 120°. The second angle 27 can be selected from a range from 60° to 115°, in particular from a range of from 80° to 110°.

In general, with more than four first and/or second support elements 22, 23 one, two, three or more of the first and/or second support elements 22, 23 can be arranged at a distance from the immediately adjacent first and/or second support elements 22, 23, which is not equal to the distance between the remaining first and/or second support elements 22, 23. In an extreme case the first and/or second support elements 22, 23 can be arranged completely at random on the first surface 19 or the second surface 21.

It is also possible that the first and second support elements 22, 23 are arranged in axial direction 13 (FIG. 4) opposite one another or offset to one another on the first surface 19 or the second surface 21. In this case only one or several of the first and second support elements 22, 23 are arranged in axial direction 13 (FIG. 4) opposite one another or offset to one another on the first surface 19 or the second surface 21.

It is also possible for the first and/or second support elements 22, 23 to be arranged in radial direction at the same height (as shown in FIGS. 2 and 3) or at a different height, wherein it is also possible that only one or several are arranged in radial direction at the same height or different heights.

With regard to the geometric shape the first and/or second support elements 22, 23 can have any suitable form. For example, the first and/or second support surface 24, 25 can be square, rectangular, round, oval, polygonal, curved (sickle shaped) etc.

In the preferred embodiment variant the first and/or second support elements 22, 23 however—as also shown in FIGS. 2 and 3—have an elongated form, with a longitudinal extension in a radial direction of the gearwheel arrangement 1. However, it is also possible for the support elements 22, 23 to be formed running obliquely to the radial direction.

Preferably, the ratio of a length 28 in radial direction to a width 29 in circumferential direction 3 of the first and/or second support elements 22, 23 is selected from a range of 2:1 to 8:1.

The first support elements 22 have a first height 30 above the first surface 19 of the main gearwheel 2 in axial direction 13, as shown in FIG. 5. The second support elements 22 have a second height 31 above the second surface 21 of the rotatable gearwheel 4 in axial direction 13 (FIG. 13).

The spring element 7 has a wall thickness 32 in a radial direction.

It is thus an advantage if the sum of the first height 30, second height 31 and wall thickness 32 has a value which corresponds to a distance x 33, at which the first surface 19 of the main gearwheel 2 is removed from the second surface 21 of the rotatable gearwheel 4.

In general however, the sum of the first height 30, second height 31 and wall thickness 32 have a value which is between 50% and 100%, in particular between 90% and 100%, of the distance x 33. It is also possible that at least one but also a plurality of first support elements 22 and/or second support elements 23 have a first height 30 or second height 31 different from the remaining first support elements 22 and/or second support elements 23.

The first support elements 22 can have a first height 30 above the first surface 19, which is selected from a range of 0.05 mm to 1 mm, in particular is selected from a range of 0.1 mm to 0.8 mm.

The second support elements 23 can have a second height 31 over the second surface 21, which is selected from a range of 0.05 mm to 1 mm, in particular is selected from a range of 0.1 mm to 0.8 mm.

It is also possible that the first height 31 of the first support elements 22 is equal to or different from the second height 32 of the second support elements 23.

It is also possible that the support elements 22 and/or 23 and/or the spring element 7 is or are provided at least in some parts with a lubricant coating, in particular in the area of the mount of the spring element 7 on the support elements 22, 23. For example, said lubricant coating can be formed by a lubricant paint.

A lubricant coating within the meaning of the invention is a coating by means of which the friction of adjoining surfaces is reduced.

The layer thickness of the lubricant coating can be considered with respect to the above sum of first height 30, second height 31 and wall thickness 32 relative to the distance x 33.

In the preferred embodiment the main gearwheel 2 and the rotatable gearwheel 4 are made from a metal sintered material. This is the case in particular because in this way the demolding of the first and second support elements 22, 23 can be performed relatively easily in series. However, it should be mentioned that the main gearwheel 2 and/or the rotatable gearwheel 4 can also be made from a solid material.

In particular, with respect to the production by sintering it has proved to be advantageous if the first support elements 22 and/or second support elements 23 have no sharp-edged transitions between adjoining surfaces. In this way for example from the first surface 19 in the direction of the first support surface 24 of the first support element 22 oblique ramps can be formed, as shown in FIG. 5. Likewise, from the second surface 21 in the direction of the second support surface 25 of the second support elements 23 oblique ramps of this kind can be formed.

Furthermore, radial end sections of the elongated first and/or second support elements 22, 23 can be provided with a rounding, as shown in FIGS. 2 and 3.

By way of all of these measures the demolding process of the main gearwheel 2 and the rotatable gearwheel 4 can be improved, whereby the first and second support elements 22, 23 are not destroyed during the demolding.

To secure the relative axial position of the rotatable gearwheel 4 in relation to the main gearwheel 2 a securing element 34, in particular a securing ring, can be provided, as shown in FIG. 4. The securing ring can be held in a corresponding, in particular groove-like mount 35.

However, it is also possible or preferred that the rotatable gearwheel 4 is pretensioned in axial direction against the main gearwheel 2. In addition, instead of the securing element 34 in the mount 35 a further spring element can be arranged, for example the aforementioned additional spring element 14 (cf. FIG. 1). By means of the pretensioning the rotation or twisting of the spring element 7, with which the rotatable gearwheel 4 is pretensioned in circumferential direction 3 relative to the main gearwheel 2, is preferably avoided or prevented. By means of the pretensioning the dynamic behavior of the gearwheel arrangement 1 is changed, in that the latter becomes slower because of the higher friction.

Finally, as a point of formality, it should be noted that for a better understanding of the structure of the gearwheel arrangement 1 the latter and its components have not been represented true to scale in part and/or have been enlarged and/or reduced in size.

LIST OF REFERENCE NUMERALS 1 gearwheel arrangement
2 main gearwheel
3 circumferential direction
4 gearwheel
5 hub
6 recess
7 spring element
8 support web
9 support web
10 end section
11 end section
12 recess
13 direction
14 spring element
15 ring
16 tongue
17 groove
18 end section
19 surface
20 annular web
21 surface
22 support element
23 support element
24 support surface
25 support surface
26 angle
27 angle
28 length
29 width
30 height
31 height
32 wall thickness
33 distance
34 securing element
35 mount

The invention claimed is:

1. A gearwheel arrangement comprising:
a main gearwheel,
a gearwheel rotatable relative to the main gearwheel in a circumferential direction, and
a spring element having a thickness;
wherein the main gearwheel comprises a hub and the rotatable gearwheel is arranged on the hub;
wherein the main gearwheel comprises a first surface and the rotatable gearwheel comprises a second surface;
wherein the main gearwheel comprises a first support web and the rotatable gearwheel comprises a second support web;
wherein the spring element is arranged between the first surface of the main gearwheel and the second surface of the rotatable gearwheel, bears on the first support web and the second support web and pretensions the rotatable gearwheel in a circumferential direction against the main gearwheel;
wherein the first surface of the main gearwheel comprises a plurality of first support elements formed in one piece with the main gearwheel and projecting outwardly therefrom toward the second surface of the rotatable gearwheel;
wherein the second surface of the rotatable gearwheel comprises a plurality of second support elements formed in one piece with the rotatable gearwheel and projecting outwardly therefrom toward the first surface of the main gearwheel;
wherein the spring element is arranged between the first support elements of the main gearwheel and the second support elements of the rotatable gearwheel such that the spring element is spaced apart from the first surface of the main gearwheel and the second surface of the rotatable gearwheel; and
wherein the spring element is arranged spaced apart from the first support elements and/or the second support elements in a space between the first and second support elements, the space being greater than the thickness of the spring element.

2. The gearwheel arrangement of claim 1, wherein at least three second support elements are provided.

3. The gearwheel arrangement of claim 1, wherein at least four first support elements are provided.

4. The gearwheel arrangement of claim 1, wherein at least one of the first support elements and the second support elements are configured to be elongated in a radial direction of the gearwheel arrangement.

5. The gearwheel arrangement of claim 4, wherein a ratio of a length to a width of the first support elements and/or the second support elements is selected from a range of from 2:1 to 8:1.

6. The gearwheel arrangement of claim 1, wherein the spring element is configured as an omega spring having an open part; and
wherein the first support elements are arranged in an area next to the open part of the omega spring.

7. The gearwheel arrangement of claim 1, wherein the first surface of the main gearwheel and the second surface of the rotatable gearwheel are spaced apart from one another by a first distance; and
   wherein a first height of the first support elements, a second height of the second support elements, and a wall thickness of the spring element correspond in an axial direction of the gearwheel arrangement to the first distance in total between 50% and 100%.

8. The gearwheel arrangement of claim 1, wherein at least one of the first support elements, the second support elements, and the spring element is provided at least in some sections with a lubricant coating.

9. The gearwheel arrangement of claim 1, further comprising an additional spring element, the additional spring element pretensioning the rotatable gearwheel in an axial direction against the main gearwheel.

10. The gearwheel arrangement of claim 1, wherein the distance between the first support elements and the spring element is between 0.1 mm and 2 mm and/or the distance between the second support elements and the spring element is between 0.1 mm and 2 mm.

* * * * *